(12) United States Patent
Geng et al.

(10) Patent No.: US 10,698,218 B1
(45) Date of Patent: Jun. 30, 2020

(54) DISPLAY SYSTEM WITH OSCILLATING ELEMENT

(71) Applicant: Facebook Technologies, LLC, Menlo Park, CA (US)

(72) Inventors: Ying Geng, Sammamish, WA (US); Yusufu Njoni Bamaxam Sulai, Bothell, WA (US); Jacques Gollier, Redmond, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 72 days.

(21) Appl. No.: 15/914,973

(22) Filed: Mar. 7, 2018

(51) Int. Cl.
*G02B 27/00* (2006.01)
*G02B 27/01* (2006.01)

(52) U.S. Cl.
CPC ..... *G02B 27/0172* (2013.01); *G02B 27/0093* (2013.01); *G02B 27/0189* (2013.01); *G02B 2027/011* (2013.01); *G02B 2027/014* (2013.01)

(58) Field of Classification Search
CPC ............ G02B 27/0172; G02B 27/0189; G02B 27/011; G02B 27/017; G02B 27/0179; G02B 27/0093; G02B 27/01; G02B 27/0176; G02B 27/0101; G02B 27/2264; G02B 2027/0178; G02B 2027/0185; G02B 2027/0134; G02B 2027/011; G06T 19/006; G06T 2207/10148; H04N 13/344; H04N 13/341; H04N 13/363; H04N 13/286; H04N 13/361; H04N 2013/0085; H04N 5/23212
See application file for complete search history.

(56) References Cited

U.S. PATENT DOCUMENTS

2015/0355461 A1* 12/2015 Kessler .............. G02B 27/0103
359/631
2016/0260258 A1* 9/2016 Lo ............................. G06T 7/00
2016/0277725 A1* 9/2016 Ellsworth ............ G02B 27/017

* cited by examiner

*Primary Examiner* — Xuemei Zheng
(74) *Attorney, Agent, or Firm* — Fenwick & West LLP

(57) ABSTRACT

A head-mounted display (HMD) contains an oscillating electronic display, an optics block, a controller, and an optional eye tracking system. The oscillating electronic display vibrates according to instructions in a manner that allows it to correct optical errors, including vergence-accommodation conflict, field curvature, fixed pattern noise, and chromatic aberration. The oscillating electronic display is configured to emit image light by oscillating through different positions along an optical axis. The optics block is configured to direct the emitted image light to an eyebox. The controller is configured to determine and provide instructions to the oscillating electronic display. These instructions include instructions specifying the amplitude and frequency of vibration as well as instructions specifying a plurality of specific sub-pixels on the display surface to activate. The eye tracking system provides eye tracking information to the controller.

21 Claims, 8 Drawing Sheets

(Real World)

(3D Display)

DISPLAY SYSTEM WITH OSCILLATING ELEMENT

BACKGROUND

This disclosure relates generally to virtual reality technology, and specifically to creating a display system with an oscillating element for use in an artificial reality head-mounted display (HMD).

Currently, vergence-accommodation conflict in 3D displays and virtual-reality (VR) headsets is mitigated using multi-planar displays. Such systems often use beamsplitters and are bulky as a result. In order to render objects at many different virtual distances, many planar displays are needed within an HMD. However, because an eye has a specific depth of focus, the separation of planes in multi-planar systems must be small in such systems. This requirement affects the amount of displays that could feasibly be added to the system, and, therefore, affects the amount of objects that can be imaged in a multi-planar system. In addition, flat displays in combination with curved optical systems may produce multiple other types of optical errors, such as chromatic aberration, field curvature, and fixed pattern noise (i.e., screen door effect).

SUMMARY

A display system allows for dynamic adjustment of a focal distance of an HMD. In some embodiments, the system includes an oscillating electronic display, an optics block, and a controller. The oscillating electronic display, in accordance with instructions, oscillates along an optical axis through a range of positions, and each position corresponds to a different distance between the oscillating electronic display and the optics block. The oscillating electronic display is further configured to emit first image light at a first position of the range of positions and emit second image light at a second position, different from the first position. A first portion of the display emits the first image light and a second portion of the display emits the second image light.

The optics block is configured to adjust the first image light and second image light emitted by the oscillating electronic display in order to form corrected light. It is further configured to direct the optically corrected light to an eyebox. The eyebox corresponds to a region in space that is occupied by an eye of the user of the HMD. The controller provides display instructions to the electronic display. These instructions include oscillation parameters of the display as well as instructions that modify the image light emitted from the display as it oscillates.

The light emitted from the oscillating electronic display is optically adjusted by the optics block to form multifocal content. Multifocal content is content that is presented at one or more image planes. The location of the one or more image planes is based in part on the location of the oscillating electronic display as it emits light. Multifocal content may be generated to, e.g., mitigate vergence-accommodation conflict, mitigate chromatic aberration, mitigate field curvature, mitigate fixed pattern noise, provide super-resolution pixels, or some combination thereof. The oscillating electronic display moves fast enough such that content presented by oscillating electronic display is integrated by an eye of the user into a single image.

In some embodiments, instead of the electronic display oscillating, one or more optical elements of the optics block oscillates. For example, a HMD may include an electronic display, an oscillating optics block, and a controller. The electronic display is configured to emit first image light and second image light, wherein a first portion of the electronic display emits the first image light and a second portion of the electronic display emits the second image light. The oscillating optics block, in accordance with instructions, oscillates along an optical axis through a range of positions, adjust first image light at a first position of the range of positions and adjust second image light at a second position that is different from the first position to form optically corrected light. The oscillating optics block directs the optically corrected light to an eyebox. The controller provides the instructions to the oscillating optics block.

Figure 1A:
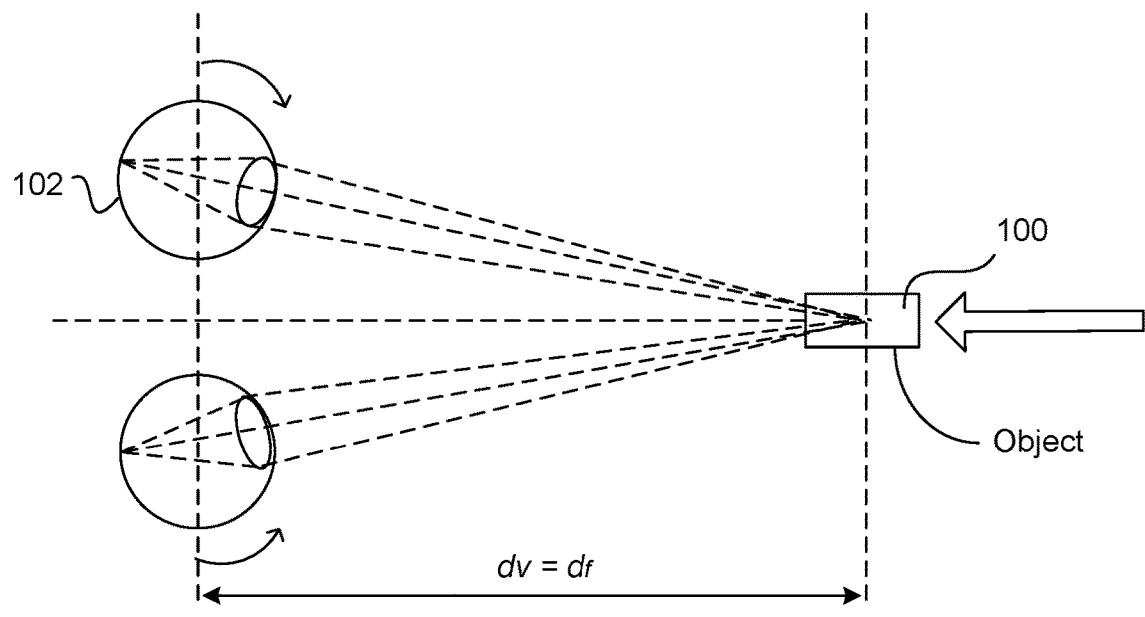
FIG. 1A shows the relationship between vergence and eye focal length in the real world.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A HMD presents content to a user. The HMD includes an oscillating electronic display, and optics block, a controller, and optionally includes an eye tracking system. The oscillating electronic display rapidly moves back and forth through a range of positions along an optical axis of the HMD. Each position of the range of positions corresponds to a different distance between the oscillating electronic display and the optics block. Note that different locations along the optical axis correspond to different image planes that content may be presented by the HMD for a given wavelength of light. The oscillating electronic display emits light, in some cases at the sub-pixel level, at different locations. The light emitted from the oscillating electronic display is optically adjusted by the optics block to form multifocal content. Multifocal content is content that is presented at one or more image planes. The location of the one or more image planes is based in part on the location of the oscillating electronic display as it emits light. Multifocal content may be generated to, e.g., mitigate vergence-accommodation conflict, mitigate chromatic aberration, mitigate field curvature, mitigate fixed pattern noise, provide super-resolution pixels, or some combination thereof. The oscillating electronic display moves fast enough such that content presented by oscillating electronic display is integrated by an eye of the user into a single image. Embodiments of the system implement an oscillating optics block, rather than an oscillating electronic display, in order to adjust the focal distance of the HMD by adjusting imagining light emitted from a fixed position. Alternate embodiments may implement a scanning assembly while maintaining the electronic display and optics block in fixed positions. The scanning assembly may change the position of one or more components of the system, for example, the electronic display, the optics block, by providing instructions to a set of actuators coupled to one of the components.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A shows the relationship between vergence and eye focal length in the real world. In the example of FIG. 1A, the user is looking at a real object 100 (i.e., the user's eyes are verged on the real object 100 and gaze lines from the user's eyes intersect at real object 100.). As the real object 100 is moved closer to the user, as indicated by the arrow in FIG. 1A, each eye 102 rotates inward (i.e., convergence) to stay verged on the real object 100. As the real object 100 gets closer, the eye 102 has to "accommodate" to the closer distance by changing the shape of the crystalline lens to reduce the focal length or increase the optical power. Thus, under normal conditions in the real world, the vergence distance ($d_v$) equals the accommodation distance ($d_f$).

Figure 1B:
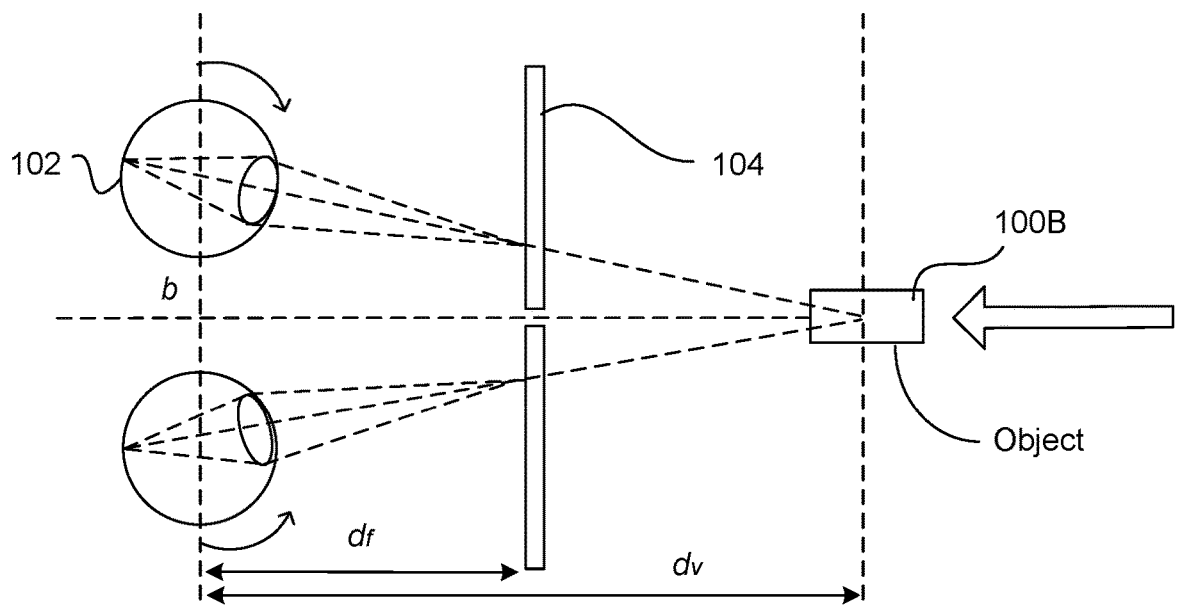
FIG. 1B shows the conflict between vergence and eye focal length in a three-dimensional display screen.

FIG. 1B shows an example conflict between vergence and accommodation that can occur with stereoscopic three-dimensional displays. In this example, a user is looking at the virtual object 100B displayed on a 3D electronic display 104; however, the user's eyes are verged on and gaze lines from the user's eyes intersect at the virtual object 100B, which is at a greater distance from the user's eyes than the 3D electronic display 104. As the virtual object 100B is rendered on the 3D electronic display 104 to appear closer to the user, each eye 102 again rotates inward to stay verged on the virtual object 100B, but the focus distance of the image is not reduced; hence, the user's eyes do not accommodate as in FIG. 1A. Thus, instead of increasing the optical power to accommodate for the closer vergence depth, eye 102 maintains accommodation at a distance associated with the 3D electronic display 104. Thus, the vergence depth (dv) often does not equal the focal length (df) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2A:
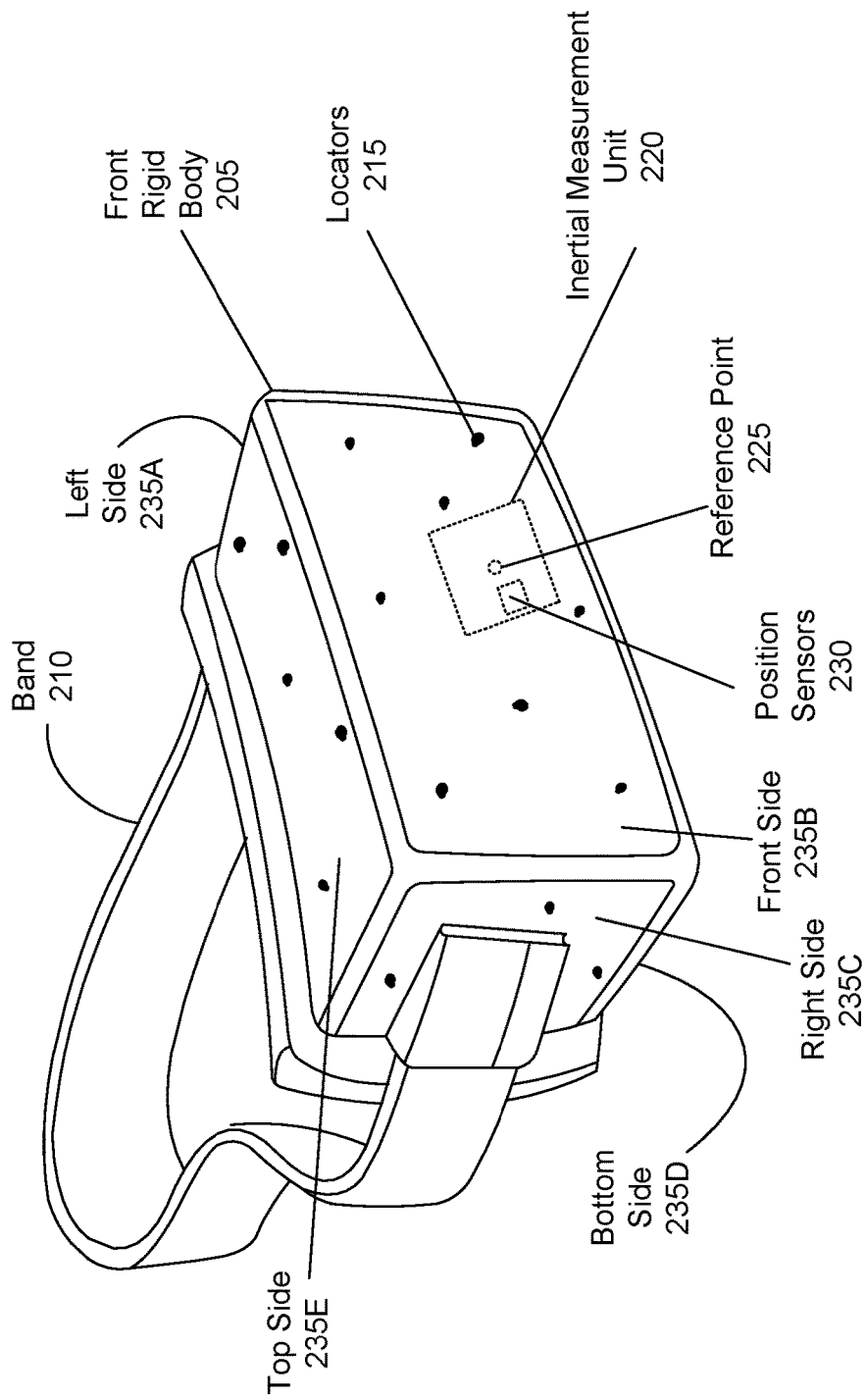
FIG. 2A is a diagram of a HMD, in accordance with one or more embodiments.

FIG. 2A is a diagram of a HMD 200, in accordance with one embodiment. Externally, the HMD 200 includes a front rigid body 205 and a band 210. Internally, the front rigid body 210 includes a plurality of locators 215, an inertial measurement unit (IMU) 220, a reference point 225, and position sensors 230. For perspective, the faces of the HMD are labeled left side 235A, front side 235B, right side 235C, bottom side 235D, and top side 235E.

The locators 215 are objects located in specific positions in the HMD 200 relative to one another and a specific reference point on the HMD 200. Each locator may be a light emitting diode (LED), a corner cube reflector, a reflective marker, a type of light source that contrasts with the operating environment of the HMD 200, or some combination thereof. In embodiments where the locators 215 are active (i.e., an LED or other type of light emitting device), the locators 215 may emit light in the visible band (~380 nm to 750 nm), in the IR band (~750 nm to 1700 nm), in the ultraviolet band (200 nm to 380 nm), some other portion of the electromagnetic spectrum, or some combination thereof. In some embodiments, the locators 220 are located beneath an outer surface of the HMD 200, which is transparent to the wavelengths of light emitted or reflected by the locators 215 or is thin enough not to substantially attenuate the wavelengths of light emitted or reflected by the locators 215. Additionally, in some embodiments, the outer surface or other portions of the HMD 200 are opaque in the visible band of wavelengths of light. Thus, the locators 215 may emit light in the IR band under an outer surface that is transparent in the IR band but opaque in the visible band.

The IMU 220 is an electronic device that generates fast calibration data based on measurement signals received from the position sensors 230. A position sensor 230 generates one or more measurement signals in response to motion of the HMD 200. Examples of position sensors 230 include: one or more accelerometers, one or more gyroscopes, one or more magnetometers, another suitable type of sensor that detects motion, a type of sensor used for error correction of the IMU 220, or some combination thereof. The position sensors 130 may be located external to the IMU 220, internal to the IMU 220, or some combination thereof.

The reference point 225 is a point that may be used to describe the position of the HMD 200. While the reference point may generally be defined as a point in space; however, in practice the reference point 230 is defined as a point within the HMD 200 (e.g., a center of the IMU 220).

Based on the one or more measurement signals from one or more position sensors 230, the IMU 220 generates IMU data indicating an estimated position of the HMD 200 relative to an initial position of the HMD 200. For example, the position sensors 130 include multiple accelerometers to measure translational motion (forward/back, up/down, left/right) and multiple gyroscopes to measure rotational motion (e.g., pitch, yaw, and roll). In some embodiments, the IMU 220 rapidly samples the measurement signals and calculates the estimated position of the HMD 200 from the sampled data. For example, the IMU 220 integrates the measurement signals received from the accelerometers over time to estimate a velocity vector and integrates the velocity vector over time to determine an estimated position of a reference point on the HMD 200.

In some embodiments, the HMD 200 may act as an artificial reality headset. In embodiments that operate as part of, e.g., an AR and/or MR environment, the HMD 200 augments views of a physical, real-world environment with computer generated elements (e.g. images, video, sound, etc.). For example, one or more portions of the HMD 200 (e.g., the front side 235B) may be at least partially transparent.

Figure 2B:
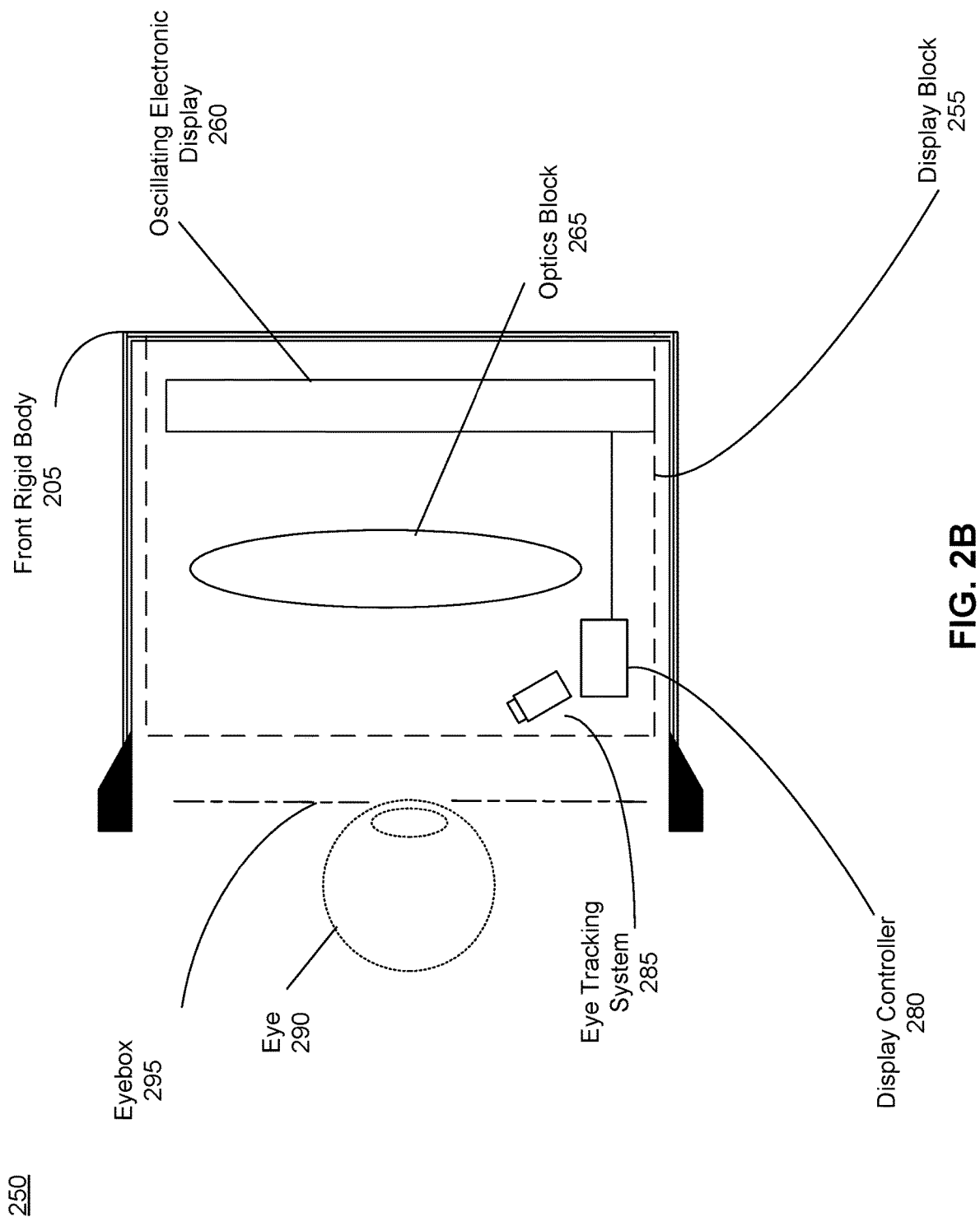
FIG. 2B is a cross section of the front rigid body of the HMD shown in FIG. 2A, in accordance with one or more embodiments.

FIG. 2B is a cross section 250 of a front rigid body (e.g., the front rigid body 205) of an HMD, in accordance with one or more embodiments. The HMD may be, e.g., the HMD 200. The HMD includes a display block 255 comprising an oscillating electronic display 260, an optics block 265, and a display controller 280. For purposes of illustration, FIG. 2B shows a cross section of the front rigid body 105 in accordance with a single eye 290. An additional oscillating electronic display 260 and optics block 265, separate from those shown in FIG. 2B, may be included in the front rigid body 105 to present content to another eye of the user. The oscillating electronic display 260 displays multifocal content to the user as a generated by the HMD 200 or another device. In particular, the oscillating electronic display 260 emits image light toward the optics block 265. Examples of the oscillating electronic display 260 include: a liquid crystal display (LCD), an organic light-emitting diode display (OLED), an active-matrix organic light-emitting diode display (AMOLED), a transparent organic light-emitting diode display (TOLED), some other display, or some combination thereof. In some embodiments, the oscillating electronic display 260 is flat.

The oscillating electronic display 260 comprises an array of sub-pixels that can be selectively activated in accordance with display instructions from the display controller 280. Which sub-pixels are activate or inactive is dependent on rendering instructions supplied by the display controller 280 as part of the display instructions. The rendering instructions direct the sub-pixels to activate or deactivate based in part on a position of the oscillating electronic display 260. The position of the oscillating electronic display is measured by its displacement from a reference position.

In some embodiments, the oscillating electronic display 260 is low persistence to help mitigate motion blur. The light emitted by the oscillating electronic display 260 is within a band of wavelengths (e.g., visible light, ~380 nm to 750 nm). The oscillating electronic display 260 vibrates at a displacement frequency (e.g., 90 Hz). The displacement frequency is a parameter received from the display controller 280 as part of the display instructions that controls a frequency at which the oscillating electronic display 260 moves through its entire range of motion. In some embodiments, the displacement frequency is at least 60 Hz. A large enough frequency allows the oscillating electronic display 260 to move between different imaging positions rapidly. The human eye does not perceive such rapid motion, and instead integrates the images emitted at each oscillation position into a single image. In this manner, the rapid motion of the display allows for the correction of many types of optical errors as discussed in detail below.

The oscillating electronic display 260 moves continuously over a range of motion. The range of motion has a center point that is positioned in a center of a range of possible positions for the oscillating electronic display 260 along an axis. A size of the range of motion is determined by a near boundary point and a far boundary point. The near boundary point is a position of the oscillating electronic display that is closest to the eyebox 295, and the far boundary point is a position of the oscillating electronic display that is farthest from the eyebox 295.

In some embodiments, the range of motion is of a fixed size (i.e., the near boundary point and the far boundary point are in fixed positions). In alternate embodiments, the size of the range of movement is dynamic (i.e., a position of the near boundary point and/or the far boundary point is dynamic) and is controlled by a displacement amplitude of the oscillating electronic display 260. The displacement amplitude is a parameter received from the display controller 280 as part of the display instructions that control a longitudinal distance through which the oscillating electronic display 260 can translate. Accordingly a maximum value for the displacement amplitude corresponds to a maximum range of movement of the oscillating electronic display 260. Whereas, a zero value for the displacement amplitude corresponds to no movement of the oscillating electronic display 260. In some embodiments, the range of movement is 0.1 mm to 5 mm. The oscillating electronic display 260 oscillates in accordance with received instructions defining the displacement amplitude and the displacement frequency. In some cases, maximum values for the displacement frequency and the displacement amplitude are inversely proportional. Therefore, oscillating at too high a frequency may limit an amount of displacement of the image plane that can be achieved. And conversely a large size of displacement may reduce a maximum displacement frequency.

The optics block 265 magnifies received image light from the oscillating electronic display 260, corrects optical errors associated with the image light, and presents the corrected image light to a user of the HMD 200. The optics block 265 directs the magnified and/or corrected image light to an eyebox 295 for presentation to a user wearing the HMD 200. The eyebox 295 is a location in space that would be occupied by an eye 290 of a user of the HMD 200.

In one embodiment, the optics block 265 includes one or more optical elements and/or combinations of different optical elements. For example, an optical elements and/or combinations of different optical elements. For example, an optical element is an aperture, a Fresnel lens, a convex lens, a concave lens, a filter, or any other suitable optical elements that affects the image light emitted from the oscillating electronic display 265. In some embodiments, one or more of the optical elements in the optics block 265 may have one or more coatings, such as anti-reflective coatings. In some embodiments, one or more of the optical elements of the optics block 265 are curved. This causes the optics block 265 to have a curved focal plane—which if used with a conventional flat display causes field curvature. However, approaches to mitigate field curvature are described below in detail with regard to FIG. 4.

Magnification of the image light by the optics block 265 allows the oscillating electronic display 260 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 265 is designed so its effective focal length is larger than the spacing to the oscillating electronic display 260, which magnifies the image light projected by the oscillating electronic display 260. Additionally, in some embodiments, the amount of magnification is adjusted by adding or removing optical elements.

In some embodiments, the optics block 265 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the oscillating electronic display 260 for display is pre-distorted, and the optics block 265 corrects the distortion when it receives image light from the oscillating electronic display 260 generated based on the content.

In some embodiments, the optics block 265 is configured to mechanically change the distance of the one or more image planes from the eye 290. In one embodiment, one or more optical elements within the optics block 265 is movable. In other embodiments, a deformable mirror or focus-changeable lens is included within the optics block 265. For example, a fast-changing deformable mirror used in a multi-planar configuration used with a display with a depth-coded pixel layout may be employed. In another embodiment, the optics block 265 includes a small form factor pancake lens. The small focal length of this lens and the fact that the lens can fold the optical path allows for a reduction in size of the display block 255. Changing the spacing between the optical elements in the pancake lens allow for adjustment of location in the image plane.

In some embodiments, the optics block 265 is the oscillating element, moving continuously over a range of motion similar to the range of motion described in reference to the oscillating electronic display 260. The size of the range of movement of the oscillating optics block is dynamic and controlled by a displacement amplitude to adjust the focal length of light emitted by the electronic display from a fixed position.

In some embodiments, an eye tracking system 285 is included with the display block 255. The eye tracking system 285 determines eye tracking information associated with one or both eyes of a user wearing the HMD 250. The eye tracking information determined by the eye tracking system 285 may comprise information about an orientation of the user's eye gaze angle, estimated accommodation plane (i.e., which plane the user's eyes are focused in), or some combination thereof. In some embodiments, the eye tracking system 285 includes one or more sources of infrared light and an infrared camera. In one embodiment, the user's eye 430 is illuminated with structured light. Then, the eye tracking system 285 uses locations of the reflected structured light in a captured image to determine the eye tracking information. In another embodiment, the eye tracking system 285 determines eye tracking information based on magnitudes of image light captured over a plurality of time instants.

The display controller 280 controls the oscillating electronic display 265. The display controller 280 provides the oscillating electronic display 265 with oscillation instructions that modify the multifocal content produced by the oscillating electronic display 265. These instructions may include, e.g., the displacement amplitude, the displacement frequency, instructions to adjust a location of an optical element in the optics block 265, or some combination thereof. For example, in cases where image planes are near a center of the range of motion and not at the edges of the range of motion, the display controller 280 may provide instructions to reduce the displacement amplitude of the oscillating electronic display 260 such that it does have to move through regions of a range of motion where it is not presenting content. For example, prior to display, the display controller 280 may determine what positions the oscillating electronic display 260 is going present content. The display controller 280 then identifies a position from the determined positions that is farthest from the center point. The display controller 280 determines a distance to the identified position and then sets a near point boundary and far point boundary at the determined distance from the center point. The display controller 280 then determines a displacement amplitude using the near point boundary and the far point boundary, and provides it to the oscillating electronic display 260 as part of the display instructions.

In order to mitigate vergence-accommodation conflict, the display controller 280 provides display instructions for translating the oscillating electronic display 260 along its range of motion in accordance with parameters, in one embodiment. These parameters include, for example, eye tracking information, the displacement amplitude, the displacement frequency, and rendering instructions. Rendering instructions describe which sub-pixels to activate for a given position of the oscillating electronic display 260. For example, the display controller 280 may determine what position of the oscillating electronic display 260 corresponds to an estimated accommodation plane of the user, and generate display instructions such that the content is displaced at the determined position. The display controller 280 then provides the generated display instructions to the oscillating electronic display 260. The display instructions allow the oscillating electronic display 260 to function as a varifocal system that mitigates vergence-accommodation conflict as described above with reference to FIGS. 1A and 1B and in detail below with regard to FIG. 3.

In some embodiments, the display controller 280 provides display instructions that cause the oscillating electronic display 260 to emulate a curved display. In one embodiment, the display controller 280 instructs the oscillating electronic display 265 to activate sub-pixels to form a curved display pattern. This is useful if, e.g., the optics block 265 has a curved focal plane. By matching the curved display pattern to the curved focal plane, the display controller 280 is able to mitigate field curvature that would otherwise occur if the oscillating electronic display 260 is flat. In these embodiments, the display controller 280 generates instructions that cause the oscillating electronic display 260 to activate sub-pixels for display locations where the sub-pixels overlap with the curved focal plane of the optics block 265. Accordingly, sub-pixels along the optical axis are active at different positions of the oscillating electronic display 260 than off-axis sub-pixels along the periphery of the oscillating electronic display 260. In this manner, the display instructions can cause the oscillating electronic display 260 generate a curved display pattern that matches any curved focal plane. For example, the curved display pattern may be cylindrical, spherical, aspherical, freeform, etc. Additionally, the curved display pattern created in accordance with the display instructions may be symmetric or lack symmetry. An example of a display block configured to mitigate field curvature is discussed in detail below with regard to FIG. 4.

In some embodiments, the display controller 280 provides display instructions for super-resolving images emitted from the oscillating electronic display 260. For example, the oscillating electronic display 260 receives instructions to activate a specific sub-pixel at a first position. As the oscillating electronic display 260 makes a small translation to a second position, the display controller 280 provides instructions to activate one or more different sub-pixels a small radial distance from the first activated sub-pixel. On a static display, the spacing between sub-pixels is large, and may create fixed pattern noise. However, as the oscillating electronic display 260 makes a translation, the eye 290 integrates the rapid sequence of images and sees a super-resolved image. A display block that provides super-resolution is discussed in detail below with regard to FIG. 5.

In some embodiments, the display controller 280 provides display instructions that selectively activates sub-pixels of different colors in order to correct for chromatic aberration. The controller 280 instructs the oscillating electronic display 260 to activate sub-pixels of different colors at different locations of the oscillating electronic display 260 to account for chromatic aberration caused by the optics block 265. A display block that accounts for chromatic aberration is discussed in detail below with regard to FIG. 6.

Figure 3:
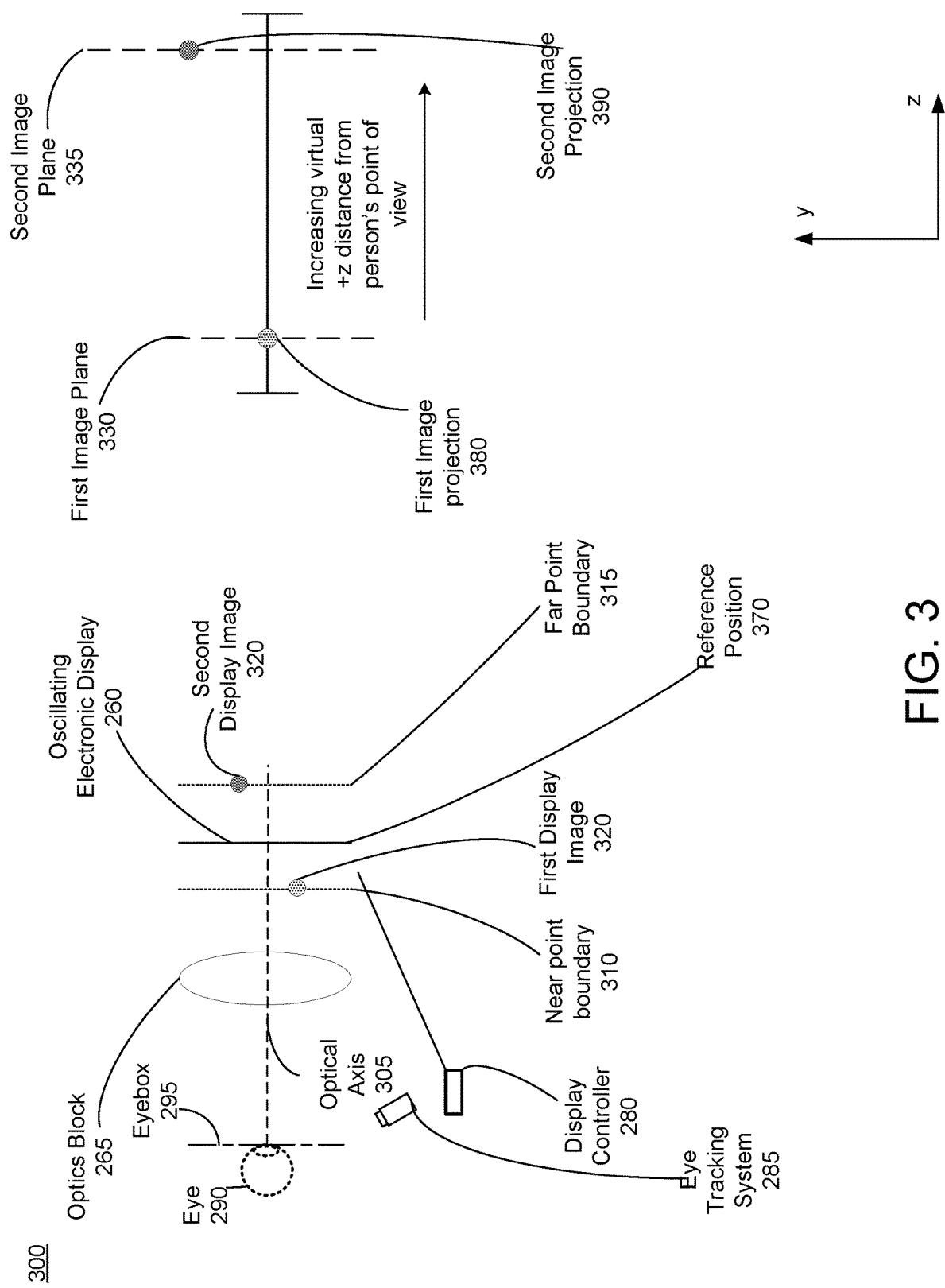
FIG. 3 shows an embodiment of a display block in a configuration used to correct vergence-accommodation conflict, in accordance with one or more embodiments.

FIG. 3 shows an embodiment of a display block 300 configured to correct vergence-accommodation conflict, in accordance with one or more embodiments. The display block 300 is an embodiment of the display block 255. The display block 300 comprises the oscillating electronic display 260, the optics block 265, the eye tracking system 285, and the display controller 280.

Vergence-accommodation conflict is a phenomenon that may occur to users of artificial reality HMDs. In normal situations, eyes converge (rotate toward one another) to focus on closer objects and diverge (rotate away from one another) to focus on objects that are further away. Accommodation is coupled with convergence, and is the process where the lenses of the eyes focus on a close or far away object. In some artificial reality systems, these two processes are decoupled. The eyes accommodate to the fixed distance of the screen of the headset, but still verge to the perceived distance of the virtual object. This decoupling can cause the user to feel uncomfortable, disoriented, or nauseous.

The oscillating electronic display 260 is configured to oscillate along an optical axis 305 in accordance with display instructions. This direction is labeled as the z-axis in FIG. 3 and all subsequent figures. The oscillating electronic display 260 is displaced as it oscillates between a near point boundary 310 and a far point boundary 315. The oscillating electronic display 260 displays a first display image 320 at the near point boundary 310 of the oscillating electronic display 260 and a second display image 325 at the far point boundary 315 of the oscillating electronic display 260.

The different locations of the oscillating electronic display 260 along its range of motion each correspond to different image planes. Accordingly, the near point boundary 310 is associated with a first image plane 330 and the far point boundary 315 is associated with the second image plane 335, and the first display image 340 is presented as the first image projection 380 at the first image plane 330 and the second display image 350 is presented as the second image projection 390 at the second image plane 335. In another embodiment, not shown, the optics block 265 is configured to oscillate along the optical axis 305 between the near point boundary 310 and the far point boundary 315 based on provided display instructions. The movement of the oscillating optics block is similar to the movement of the oscillating electronic display 265 described above.

The display block 300 may identify estimated accommodation plane of the eye 290 using eye tracking information from the eye tracking system 285. The display controller 280 may determine what position of the oscillating electronic display 260 corresponds to an estimated accommodation plane of the user, and generate display instructions such that the content is displaced by the oscillating electronic display 260 at the determined position. The display controller 280 then provides the generated display instructions to the oscillating electronic display 260. Displaying content in this manner helps mitigate vergence-accommodation conflict.

Note that as display block 300 is able to present content over a range of image planes, the display block may function as a 3-dimensional display. The oscillations of the oscillating electronic display 260 additionally translate into changes in the perceived depth of the image as observed by the user of the display block 300. For example, to the eye 290 the first display image 320 is at the first image plane 330 and the second display image 325 is at the second image plane 335. If the first image plane 330 is 0.5 meters away from the eye 290 and the second image plane 335 is 10 meters away from the eye 290, if the eye 290 focuses on either image plane content in the other plane is blurred—which is an excellent visual indicator for depth.

In one embodiment, the lens or lens system oscillates along the optical axis 305 rather than the electronic display. The lens system may include multiple optical elements (i.e., a pancake lens with an amplification factor) oscillates along the optical axis 305, decreasing the necessary vibration amplitude of the lens itself. Some embodiments of the optics block 265 may implement a reflective vibrating membrane, to oscillate along the optical axis. Likewise some embodiments the optics block 265 may include a liquid lens and/or a liquid crystal lens whose optical power is controlled by the display controller 280.

Figure 4:
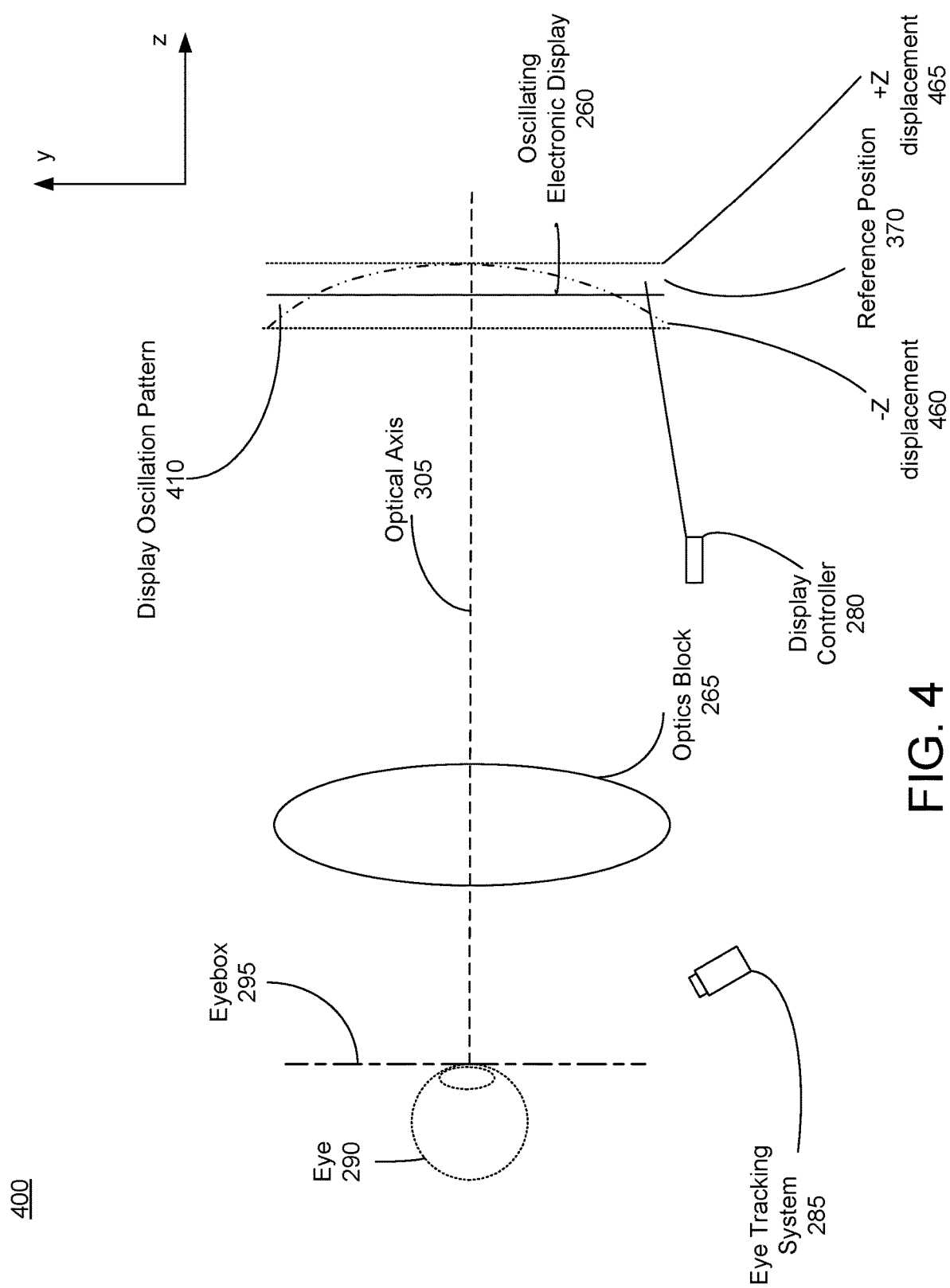
FIG. 4 shows an embodiment of a display block in a configuration used to correct field curvature, in accordance with one or more embodiments.

FIG. 4 shows an embodiment of a display block 400 configured to correct for field curvature, in accordance with one or more embodiments. The display block 400 is an embodiment of the display block 255. The display block 400 comprises the oscillating electronic display 260, the optics block 265, and the display controller 280.

Field curvature is a type of error that generally occurs when a focal plane of an optical system does not match a geometry of a display surface of a display. In this embodiment, the optics block 265 produces a curved focal plane and the oscillating electronic display 260 has a display surface that has a geometry that does not match the curved focal plane (e.g., a flat display surface). However, the display block 400 is able to mitigate field curvature that would otherwise occur by generating a curved display field.

The oscillating electronic display 260 generates a curved display pattern 410. The curved display pattern 410 substantially matches the curved focal plane of the optics block 265. Through selective activation of sub-pixels as defined by the display instructions provided by the display controller 280, the oscillating electronic display 260 emits multifocal content along the curved display pattern 410. In another embodiment, not shown, an oscillating optics block 265 generates the curved display pattern 410 which substantially matches the curved focal plane of the optics block 265. The generation of the curved display pattern 410 by the oscillating optics block is performed using the process described in reference to the oscillating electronic display 260.

A model of the curved display pattern 410 is used by the display controller 280 to generated display instructions. The model includes a mapping of sub-pixels to specific locations of the oscillating electronic display 260, such that the oscillating electronic display 260 emits image light in accordance with the curved display pattern 410. For example, the display controller 280 determines for a given sub-pixel of an image that is to be rendered, a corresponding position(s) of the oscillating electronic display 260 where the sub-pixel is active and positions of the oscillating electronic display 260 where the sub-pixel is not active. The display controller 280 determines these positions using the model. In some embodiments, the sub-pixel may be active over a range of positions within a threshold distance of the curved display pattern 410.

Figure 5:
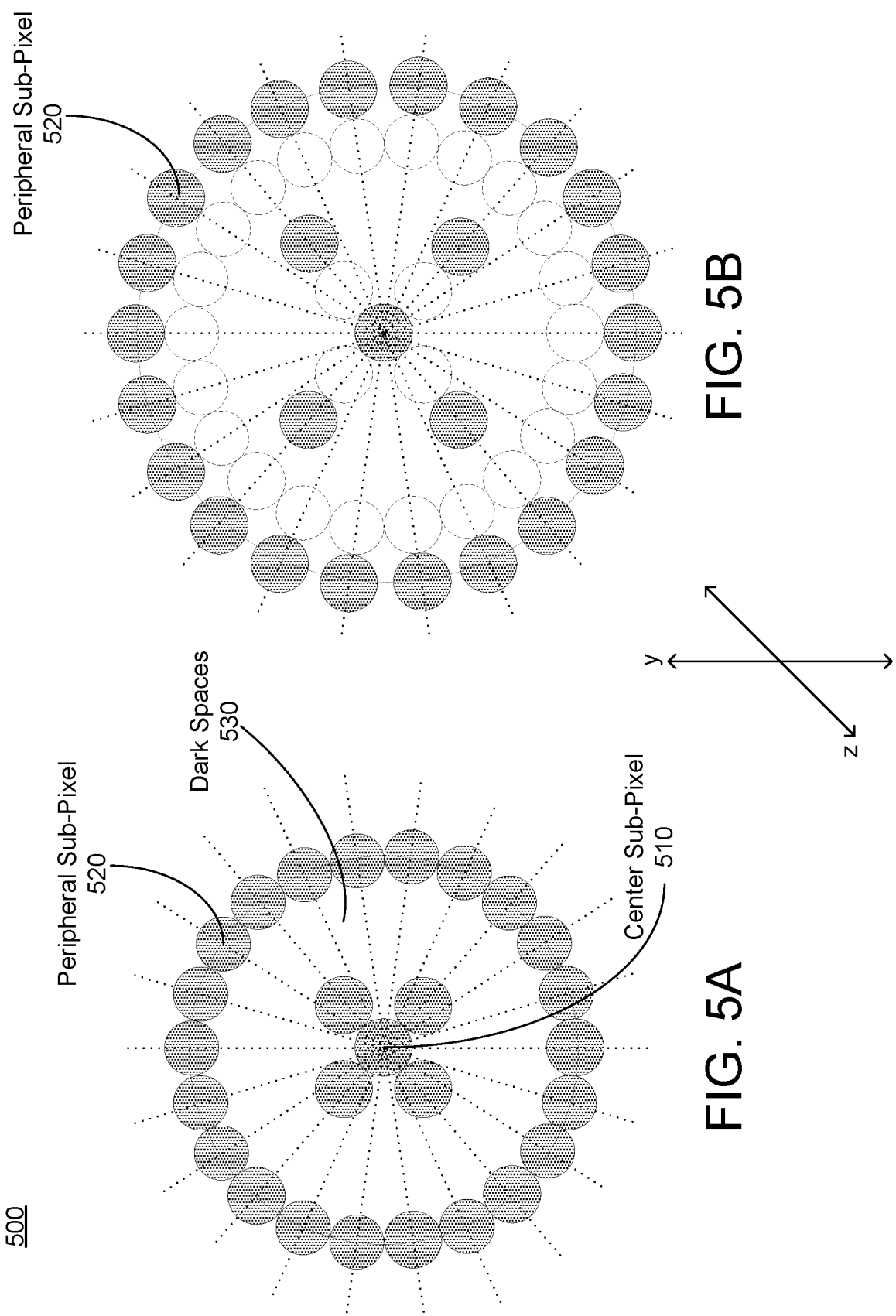
FIG. 5A shows a portion of an oscillating electronic display with a radial sub-pixel layout as viewed through an optics block, in accordance with one or more embodiments.
FIG. 5B shows a portion of an oscillating electronic display translated to a second position magnifying the set of peripheral sub-pixels, in accordance with one or more embodiments.

FIG. 5 shows an embodiment of a display block 500 configured to produce super-resolved multifocal content, in accordance with one or more embodiments. The display block 500 is an embodiment of the display block 255. The display block 500 comprises the oscillating electronic display 260, the optics block 265, and the display controller 280.

The eye 290 integrates the series of images emitted by the oscillating electronic display 260. If a specific sub-pixel changes its y-position slightly (e.g., by half a pixel width) during a z-translation, the eye 290 will see the sub-pixel as inhabiting both the space it originally occupied and the space it translated during its oscillation. This may yield, for example, five pixels being viewed in a space occupied by two pixels on a static display. In this manner, large increases in resolution occur as pixel size decreases. This effect mitigates fixed pattern noise, or "screen door effect", because the super-resolved sub-pixels mask the white space between existing sub-pixels. However, because pixels arranged radially, super-resolution only occurs in the radial direction.

FIG. 5A shows a portion of an oscillating electronic display with a radial sub-pixel layout as viewed through an optics block (e.g., the optics block 265), in accordance with one or more embodiments. In the illustrated embodiment, the oscillating electronic display and the optics block are separated by a first distance. The oscillating electronic display is an embodiment of the oscillating electronic display 260. The portion of the oscillating electronic display includes a plurality of sub-pixels that are arranged in a radial manner. The plurality of sub-pixels include a center sub-pixel 510 and a plurality of peripheral sub-pixels 520. As the oscillating electronic display moves along a z axis the peripheral sub-pixels 520 undergo a change in apparent magnification that includes an apparent radial translation. In some embodiments, as the oscillating electronic display moves towards the optics block, the activated peripheral sub-pixels 520 appear to move radially outward. In contrast, as the oscillating electronic display moves farther from the optics block, the peripheral sub-pixels 520 appear to move radially inward.

At the first position of the oscillating electronic display, described in FIG. 5A, a set of pixels, peripheral sub-pixels 520, are activated, represented as shaded sub-pixels. At this position, despite both the center sub-pixel 510 and peripheral sub-pixels 520 emitting light, dark spaces 530 are still present and separate the peripheral sub-pixels 520 from the center sub-pixel 510. As the display oscillation pattern translates with respect to the z-axis to a second position, the same set of peripheral sub-pixels 520 remain activated, but undergo a change in apparent magnification relative to the translation of the oscillating electronic display as described in FIG. 5B.

FIG. 5B shows the portion of an oscillating electronic display in FIG. 5A at a second position as viewed through the optics block, in accordance with one or more embodiments. The second position is such that there is a second distance between the optics block and the oscillating electronic display that is different than the distance of the first position. The same sub-pixels that are active in 5A are also active in 5B. But the different position of the oscillating electronic element causes a difference in apparent pixel location (i.e., where the sub-pixels appear as seen through the optics block). In this embodiments, the active sub-pixels appear to have translated radially outward from the positions shown in FIG. 5A and illustrated as dashed circles in 5B for convenience. Note that the change in position of the oscillating electronic display element results in an apparent change in magnification of the sub-pixels, and for ease of illustration changes to diameters of the subpixels due to changes in magnification is not shown.

Alternatively, the display oscillation pattern may translate in an opposite direction from the direction described in FIG. 5B, resulting in the activated sub-pixels transitioning radially inward (not shown) with respect to the y-axis. The transitioning of these activated sub-pixels with respect to the translation of the display oscillation pattern, can result in super resolution on the radial direction. For example, a sub-pixel may be selectively activated at different positions of the oscillating electronic display element such that it appears as two sub-pixels that are at a radial distance of at most one sub-pixel diameter (and in some cases less) away from each other. In this context, a sub-pixel diameter is a diameter of an emission area of the sub-pixel. In some embodiments, the sub-pixel diameter is measured from a center point of a first sub-pixel to a center point of a second sub-pixel. Alternatively, the sub-pixel diameter may be measured from a single point within an emission area of a first sub-pixel to circumference corresponding point within an emission area of a second sub-pixel. The previously described FIGS. 5A and 5B describe an example pixel layout in situations in which the display oscillation pattern only moves axially and the pixel movement is radial. In other instances, the display oscillation pattern may move in two different directions, which would result in super resolution on two different axes.

Figure 6:
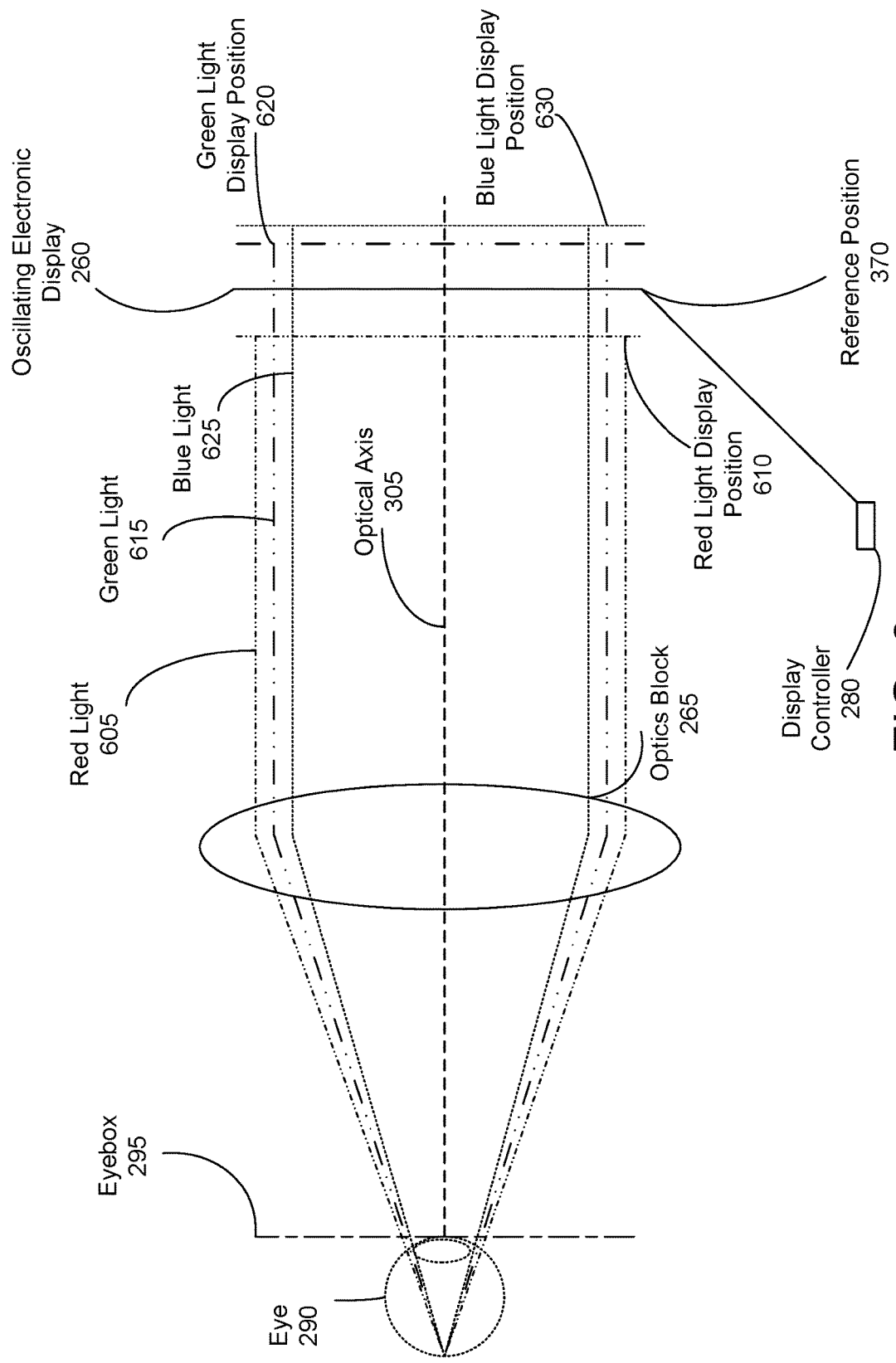
FIG. 6 shows an embodiment of a display block in a configuration used to correct chromatic aberration, in accordance with one or more embodiments.

FIG. 6 shows an embodiment of a display block 600 configured to correct chromatic aberration, in accordance with one or more embodiments. The display block 600 is an embodiment of the display block 255. The display block embodiment 600 comprises the oscillating electronic display 260, the optics block 265, and the display controller 280.

Due to differences in refractive properties between lights of various wavelengths, chromatic aberration of the optics block 265 causes light originating from a pixel to focus at slightly different locations. The display block 600 mitigates chromatic aberration by having the oscillating electronic display element 260 emit light of a specific color bands in different positions. The oscillating electronic display 260 emits light in, e.g., three separate color bands at three different positions. The first color band is of longer wavelength than the second color band and the second color band is of longer wavelength than the third color band. More specifically, in the example illustrated in FIG. 6, the oscillating electronic display 260 emits red light 605 at a position 610, green light 615 at a position 620 closer to the optics block than the position 610, and blue light 625 at a position 630 closer to the optics block than the position 620. Imaging differently colored light at these positions corrects for the distortions present in the optics block 265 and cause the emitted light rays to converge at the same point on the retina of the eye 290.

HMD System Overview

Figure 7:
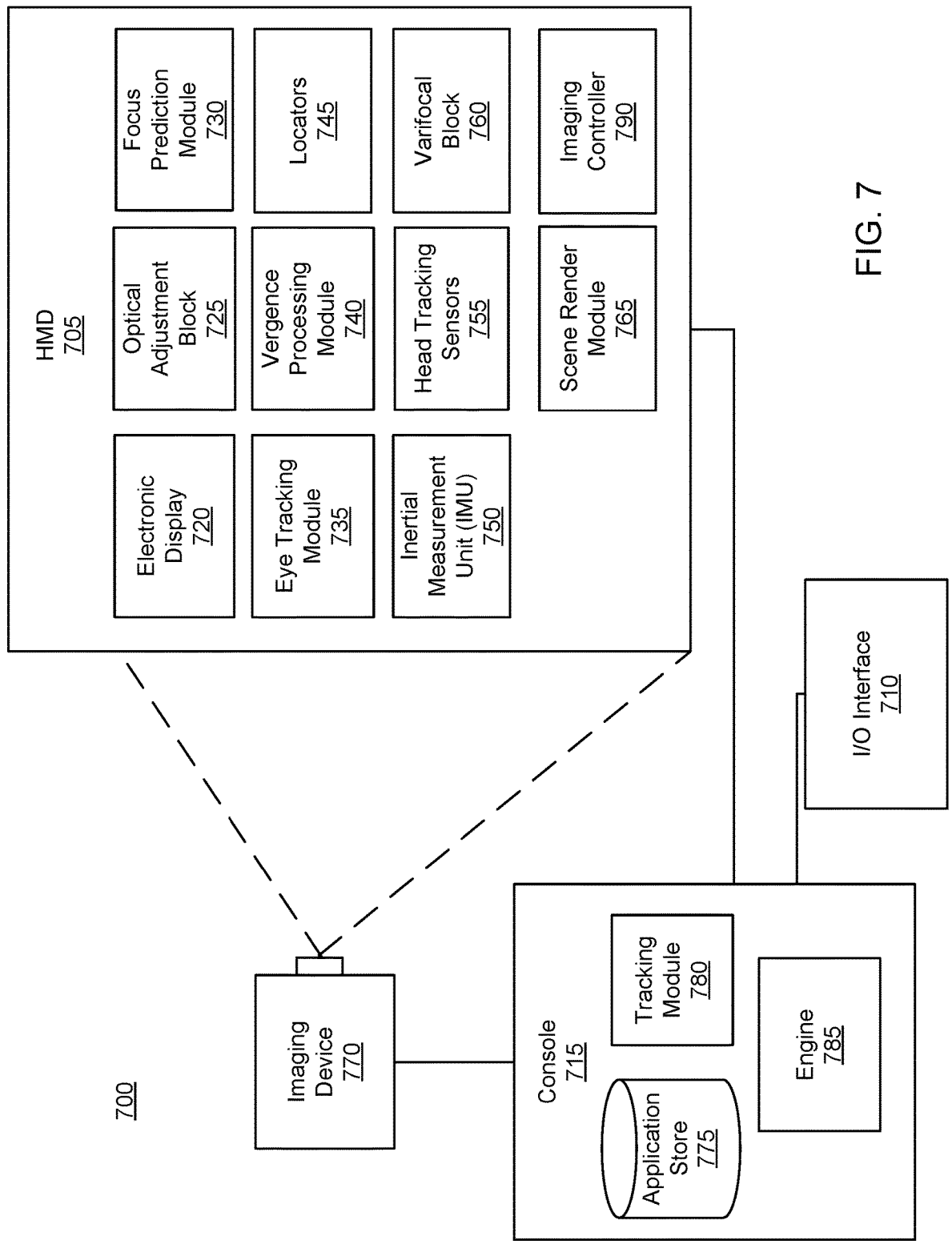
FIG. 7 shows an example artificial reality system, in accordance with one or more embodiments.

FIG. 7 is an artificial reality system 700 in accordance with an embodiment. The system 700 may be for use as a virtual reality (VR) system, an augmented reality (AR) system, a mixed reality (MR) system, or some combination thereof. In this example, the system 700 includes a HMD 705, an I/O interface 710, and an imaging device 770, which are each coupled to a console 715. While FIG. 7 shows a single HMD 705, a single I/O interface 710, and a single imaging device 770, in other embodiments, any number of these components may be included in the system. For example, there may be multiple HMDs 700 each having an associated I/O interface 710 and being monitored by one or more imaging devices 770, with each HMD 705, I/O interface 710, and imaging devices 770 communicating with the console 715. In alternative configurations, different and/or additional components may also be included in the system 700.

The HMD 705 may act as a VR, AR, and/or a MR HMD. An MR and/or AR HMD augments views of a physical, real-world environment with computer-generated elements (e.g., images, video, sound, etc.). The HMD 705 presents content to a user. In some embodiments, the HMD 200 is an embodiment of the HMD 705. Example content includes images, video, audio, or some combination thereof. In the embodiments of FIGS. 2-6, the HMD 705 is configured to present multifocal content, meaning that different portions of the displayed content are presented on different image planes and integrated by the eye. Audio content may be presented via a separate device (e.g., speakers and/or headphones) external to the HMD 705 that receives audio information from the HMD 705, the console 715, or both. The HMD 705 includes an electronic display 720, an optics block 725, a focus prediction module 730, an eye tracking module 735, one or more locators 745, the internal measurement unit (IMU) 750, one or more head tracking sensors 755, a varifocal block 760, a scene render module 765, and one or more imaging controllers 790.

The electronic display 720 displays 2D or 3D images to the user in accordance with data received from the console 725. In various embodiments, the electronic display 720 comprises a single electronic display element (e.g., the oscillating electronic display 260) or multiple oscillating electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 725 magnifies image light received from the electronic display 720, corrects optical errors associated with the image light, and presents the corrected image light to a user of the HMD 705. The optics block 725 includes a plurality of optical elements. In some embodiments, the optics block 725 includes one or more oscillating elements and acts as an oscillating optics block. Example optical elements included in the optics block 725 include: an aperture, a Fresnel lens, a convex lens, a concave lens, a filter, a reflecting surface, a feature waveguide, or any other suitable optical element that affects image light. Moreover, the optics block 725 may include combinations of different optical elements. In some embodiments, one or more of the optical elements in the optics block 725 may have one or more coatings, such as partially reflective or anti-reflective coatings. The optics block 725, in some embodiments, may comprise a single optics block (e.g., the optics block 265) or multiple optics blocks (e.g., one for each eye). Each of the multiple optics blocks may contain different optical elements in order to correct for different optical aberrations present when viewed with either eye.

The focus prediction module 730 is an encoder including logic that tracks the state of the electronic display 720 to predict to a plurality of future states of the electronic display 720. For example, the focus prediction module 730 accumulates historical information corresponding to previous states of the electronic display 720 and predicts a future state of the multi-focal display system 720 based on the previous states. Because rendering of a virtual scene by the HMD 705 is adjusted based on the state of the multi-focal display system 720, the predicted state allows the scene rendering module 765, further described below, to determine an adjustment to apply to the virtual scene for a particular frame. Accordingly, the focus prediction module 730 communicates information describing a predicted state of the electronic display 720 for a frame to the varifocal block 760 and/or the scene rendering module 765. Adjustments for the different states of the multi-focal display system 720 performed by varifocal module 760 and/or the scene rendering module 765 are further described below.

The eye tracking module 735 determines eye tracking information associated with one or both eyes of a user wearing the HMD 705. The eye tracking information determined by the eye tracking module 735 may comprise information about an orientation of the user's eye, i.e., information about an angle of an eye-gaze. The eye tracking system includes a structured light emitter that illuminates one or both eyes of the user with a dense structured light pattern. A camera assembly captures images of the dense structured light pattern reflected by a portion of the eye(s) being tracked. The eye tracking module determines a position of the eye(s) being tracked with up to six degrees of freedom. The eye tracking module 735 then determines eye tracking information using the determined position(s). For example, give position of an eye the eye tracking module 735 can determine a gaze angle. The eye tracking module 735 may be the eye tracking system 285, as in the embodiments of FIGS. 2-6. In the HMD of FIGS. 2A and 2B, the eye tracking system 285 is optional.

Vergence processing module 740 determines a vergence depth of a user's gaze based on the gaze point or an estimated intersection of the gaze lines determined by the eye tracking module 735. Vergence is the simultaneous movement or rotation of both eyes in opposite directions to maintain single binocular vision, which is naturally and automatically performed by the human eye. Thus, a location where a user's eyes are verged is where the user is looking and is also the location where the user's eyes are focused in a natural viewing situation. For example, the vergence processing module 740 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 745 are objects located in specific positions on the HMD 705 relative to one another and relative to a specific reference point on the HMD 705. The locators 215 are an embodiment of the locators 745. A locator 745 may be a light emitting diode (LED), a corner cube reflector, a reflective marker, a type of light source that contrasts with an environment in which the HMD 705 operates, or some combination thereof. Active locators 745 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 745 can be located beneath an outer surface of the HMD 705, which is transparent to the wavelengths of light emitted or reflected by the locators 745 or is thin enough not to substantially attenuate the wavelengths of light emitted or reflected by the locators 745. Further, the outer surface or other portions of the HMD 705 can be opaque in the visible band of wavelengths of light. Thus, the locators 745 may emit light in the IR band while under an outer surface of the HMD 705 that is transparent in the IR band but opaque in the visible band.

The IMU 750 is an electronic device that generates fast calibration data based on measurement signals received from a plurality of head tracking sensors 755, which generate a plurality of measurement signals in response to motion of the HMD 705. Examples of the head tracking sensors 755 include accelerometers, gyroscopes, magnetometers, other sensors suitable for detecting motion, correcting error associated with the IMU 750, or some combination thereof. The head tracking sensors 755 may be located external to the IMU 750, internal to the IMU 750, or some combination thereof.

Based on the measurement signals from the head tracking sensors 755, the IMU 750 generates fast calibration data indicating an estimated position of the HMD 705 relative to an initial position of the HMD 705. For example, the head tracking sensors 755 include multiple accelerometers to measure translational motion (forward/back, up/down, left/right) and multiple gyroscopes to measure rotational motion (e.g., pitch, yaw, and roll). The IMU 750 can, for example, rapidly sample the measurement signals and calculate the estimated position of the HMD 705 from the sampled data. For example, the IMU 750 integrates measurement signals received from the accelerometers over time to estimate a velocity vector and integrates the velocity vector over time to determine an estimated position of a reference point on the HMD 705. The reference point is a point that may be used to describe the position of the HMD 705. While the reference point may generally be defined as a point in space, in various embodiments, reference point is defined as a point within the HMD 705 (e.g., a center of the IMU 750). Alternatively, the IMU 750 provides the sampled measurement signals to the console 715, which determines the fast calibration data.

The IMU 750 can additionally receive a plurality of calibration parameters from the console 715. As further discussed below, the plurality of calibration parameters are used to maintain tracking of the HMD 705. Based on a received calibration parameter, the IMU 750 may adjust a plurality of IMU parameters (e.g., sample rate). In some embodiments, certain calibration parameters cause the IMU 750 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

In some embodiments, the varifocal block 760 is further integrated into the HMD 705. The varifocal block 760 may be coupled to the eye tracking module 735 to obtain eye tracking information determined by the eye tracking module 735. The varifocal block 760 may be configured to adjust focus of one or more images displayed on the electronic display 720, based on the determined eye tracking information obtained from the eye tracking module 735. In this way, the varifocal block 760 can mitigate vergence-accommodation conflict in relation to image light. The varifocal block 760 can be interfaced (e.g., either mechanically or electrically) with at least one of the electronic display 720 and at least one optical element of the optics block 725. Then, the varifocal module 760 may be configured to adjust focus of the one or more images displayed on the electronic display 720 by adjusting position of at least one of the electronic display 720 and the at least one optical element of the optics block 725, based on the determined eye tracking information obtained from the eye tracking module 735. By adjusting the position, the varifocal module 760 varies focus of image light output from the electronic display 720 towards the user's eye. The varifocal module 760 may be also configured to adjust resolution of the images displayed on the electronic display 720 by performing foveated rendering of the displayed images, based at least in part on the determined eye tracking information obtained from the eye tracking module 735. In this case, the varifocal module 760 provides appropriate image signals to the electronic display 720. The varifocal module 760 provides image signals with a maximum pixel density for the electronic display 720 only in a foveal region of the user's eye-gaze, while providing image signals with lower pixel densities in other regions of the electronic display 720.

The scene render module 765 can adjust the content based on information from the focus prediction module 730, the vergence processing module 740, the IMU 750, the head tracking sensors 755, and the eye tracking module 735. For example, upon receiving the content from the engine 785, the scene render module 765 adjusts the content based on the predicted state (i.e., eye position and focal length) of the multi-focal display system 720 received from the focus prediction module 730. Additionally, the scene render module 765 determines a portion of the content to be displayed on the multi-focal display system 720 based on a plurality of the tracking module 780, the head tracking sensors 755, or the IMU 750, as described further below.

The imaging device 770 generates slow calibration data in accordance with calibration parameters received from the console 715. Slow calibration data includes one or more images showing observed positions of the locators 755 that are detectable by imaging device 770. The imaging device 770 may include one or more cameras, one or more video cameras, other devices capable of capturing images including one or more locators 745, or some combination thereof. Additionally, the imaging device 770 may include one or more filters (e.g., for increasing signal to noise ratio). The imaging device 770 is configured to detect light emitted or reflected from the locators 745 in a field of view of the imaging device 770. In embodiments where the locators 745 include passive elements (e.g., a retroreflector), the imaging device 770 may include a light source that illuminates some or all of the locators 745, which retro-reflect the light towards the light source in the imaging device 770. Slow calibration data is communicated from the imaging device 770 to the console 715, and the imaging device 770 receives one or more calibration parameters from the console 715 to adjust one or more imaging parameters (e.g., focal length, focus, frame rate, ISO, sensor temperature, shutter speed, aperture, etc.).

The I/O interface 710 is a device that allows a user to send action requests to the console 715. An action request is a request to perform a particular action. For example, an action request may be to start or end an application or to perform a particular action within the application. The I/O interface 710 may include one or more input devices. Example input devices include a keyboard, a mouse, a game controller, or any other suitable device for receiving action requests and communicating the received action requests to the console 715. An action request received by the I/O interface 710 is communicated to the console 715, which performs an action corresponding to the action request. In some embodiments, the input interface 710 may provide haptic feedback to the user in accordance with instructions received from the console 715. For example, haptic feedback is provided by the input interface 710 when an action request is received, or the console 715 communicates instructions to the input interface 715 causing the I/O interface 710 to generate haptic feedback when the console 715 performs an action.

The console 715 provides content to the HMD 705 for presentation to the user in accordance with information received from the imaging device 770, the HMD 705, or the I/O interface 710. In the example shown in FIG. 7, the console 715 includes an application store 775, a tracking module 780, and an engine 785. Some embodiments of the console 715 have different or additional modules than those described in conjunction with FIG. 7. Similarly, the functions further described below may be distributed among components of the console 715 in a different manner than is described here.

The application store 775 stores one or more applications for execution by the console 715. An application is a group of instructions, that when executed by a processor, generates content for presentation to the user. Content generated by an application may be in response to inputs received from the user via movement of the HMD 705 or the I/O interface 710. Examples of applications include gaming applications, conferencing applications, video playback application, or other suitable applications.

The tracking module 780 calibrates the system 700 using one or more calibration parameters and may adjust one or more calibration parameters to reduce error in determining position of the HMD 705. For example, the tracking module 780 adjusts the focus of the imaging device 770 to obtain a more accurate position for observed locators 745 on the HMD 705. Moreover, calibration performed by the tracking module 780 also accounts for information received from the IMU 215. Additionally, if tracking of the HMD 705 is lost (e.g., imaging device 770 loses line of sight of at least a threshold number of locators 745), the tracking module 780 re-calibrates some or all of the system 700 components.

Additionally, the tracking module 780 tracks the movement of the HMD 705 using slow calibration information from the imaging device 710 and determines positions of a reference point on the HMD 705 using observed locators from the slow calibration information and a model of the HMD 705. The tracking module 780 also determines positions of the reference point on the HMD 705 using position information from the fast calibration information from the IMU 750 on the HMD 705. Additionally, the tracking module 780 may use portions of the fast calibration information, the slow calibration information, or some combination thereof, to predict a future location of the HMD 705, which is provided to the engine 785.

The engine 785 executes applications within the system 700 and receives position information, acceleration information, velocity information, predicted future positions, or some combination thereof for the HMD 705 from the tracking module 780. Based on the received information, the engine 785 determines content to provide to the HMD 705 for presentation to the user, such as a virtual scene, one or more virtual objects to overlay onto a real world scene, etc. Additionally, the engine 785 performs an action within an application executing on the console 715 in response to an action request received from the I/O interface 710 and provides feedback to the user that the action was performed. The provided feedback may be visual or audible feedback via the HMD 705 or haptic feedback via VR I/O interface 710.

In some embodiments, the engine 785 estimates one or more future positions of the HMD 705 using the fast calibration data from the HMD 705. The engine 785 generates warping parameters based on the one or more estimated future positions, and provides the warping parameters to the HMD 705 with the content.

In some embodiments, based on the eye tracking information (e.g., orientation of the user's eye) received from the eye tracking module 735, the engine 785 determines resolution of the content provided to the HMD 705 for presentation to the user on the electronic display 720. The engine 785 provides the content to the HMD 705 having a maximum pixel resolution on the electronic display 720 in a foveal region of the user's gaze, whereas the engine 785 provides a lower pixel resolution in other regions of the electronic display 720, thus achieving less power consumption at the HMD 705 and saving computing cycles of the console 715 without compromising a visual experience of the user. In some embodiments, the engine 785 can further use the eye tracking information to adjust where objects are displayed on the electronic display 720 to prevent vergence-accommodation conflict.

The imaging controller 790 provides instructions directing the electronic display 720 to display multifocal content. These instructions include directing the electronic display 720 to display audio, image, or video content. In some embodiments, the imaging controller 790 is the display controller 280. The imaging controller 790, in some embodiments, comprises a single controller, and in other embodiments, comprises multiple (e.g., one for each eye). The imaging controller 790 may provide instructions to the electronic display 720 to display different content items at different focal lengths. For example, in the embodiments of FIGS. 3-6, the display controller 280 instructs the oscillating electronic display 260 to activate sub-pixels on different portions of a display surface of the oscillating electronic display 260 responsive to displacements of the oscillating electronic display 260 from a reference point 370. In addition, the imaging controller 790 provides instructions specifying parameters of motion for the electronic display 720, including amplitudes and frequencies of vibration. Multiple imaging controllers 790 may be employed to send different sets of instructions to multiple displays, in order to correct for multiple types of optical errors.

Additional Configuration Information

The foregoing description of the embodiments of the disclosure has been presented for the purpose of illustration;

it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
    an oscillating electronic display, in accordance with instructions, configured to continuously oscillate along an optical axis through a range of positions to emit light along the range of positions to form a curved display pattern, wherein a first portion of the oscillating electronic display emits a first image light at a first position of the range of positions and a second portion of the oscillating electronic display emits a second image light at a second position of the range of positions and the second position is different from the first position;
    an optics block configured to adjust the first image light and the second image light to form optically corrected light, and direct the optically corrected light to an eyebox, the eyebox corresponding to a region in space that is occupied by an eye of a user of the system; and
    a controller configured to provide the instructions to the electronic display.

2. The system of claim 1, wherein the instructions modify an amplitude and a frequency of oscillation of the oscillating electronic display.

3. The system of claim 1, wherein the first image light is of a first color band and the second image light is of a second color band.

4. The system of claim 1, wherein the system further comprises an eye tracking system configured to determine eye tracking information and provide the determined eye tracking information to the controller.

5. The system of claim 4, wherein the controller is further configured to:
    estimate a location of an accommodation plane of the user based in part on the determined eye tracking information;
    determine a position of the oscillating electronic display that corresponds to the estimated accommodation plane; and
    wherein the instructions are generated based in part on the determined position of the oscillating electronic display.

6. The system of claim 1, wherein sub-pixels of the oscillating electronic display are arranged radially.

7. The system of claim 6, wherein the first portion of the oscillating electronic display includes a sub-pixel that emits light at the first position and emits light at a third position of the oscillating electronic display, and the sub-pixel appears to be radially displaced in the third position relative to the first position, and the amount of radial displacement is at most a diameter of an emission area of the sub-pixel.

8. The system of claim 1, wherein the system is part of a head-mounted display.

9. A system, comprising:
    an electronic display configured to emit first image light and second image light, wherein a first portion of the electronic display emits the first image light and a second portion of the electronic display emits the second image light;
    an oscillating optics block, in accordance with instructions, configured to continuously oscillate along an optical axis through a range of positions, adjust the first image light at a first position of the range of positions and adjust the second image light at a second position that is different from the first position to form optically corrected light, and direct the optically corrected light to an eyebox, the eyebox corresponding to a region in space that is occupied by an eye of a user of the system; and
    a controller configured to provide the instructions to the oscillating optics block.

10. The system of claim 9, wherein the instructions modify an amplitude and a frequency of oscillation of the oscillating optics block.

11. The system of claim 9, wherein the instructions cause the oscillating optics block to adjust light in accordance with a curved display pattern, and the first position and the second position describe different positions of the oscillating optics block along the curved display pattern.

12. The system of claim 9, wherein the first image light is of a first color band and the second image light is of a second color band.

13. The system of claim 9, wherein the system further comprises an eye tracking system configured to determine eye tracking information and provide the determined eye tracking information to the controller.

14. The system of claim 13, wherein the controller is further configured to:
   estimate a location of an accommodation plane of the user based in part on the determined eye tracking information;
   determine a position of the oscillating optics block that corresponds to the estimated accommodation plane, and
   wherein the instructions are generated based in part on the determined position of the oscillating optics block.

15. The system of claim 9, wherein sub-pixels of the electronic display are arranged radially.

16. The system of claim 15, wherein the first portion of the electronic display includes a sub-pixel that emits light at the first position and emits light at a third position of the oscillating optics block, and the sub-pixel appears to be radially displaced in the third position relative to the first position, and the amount of radial displacement is at most a diameter of an emission area of the sub-pixel.

17. A system, comprising:
   an electronic display configured to emit first image light and second image light, wherein a first portion of the electronic display emits the first image light and a second portion of the electronic display emits the second image light;
   an optics block configured to adjust the first image light and the second image light to form optically corrected light and direct the optically corrected light to an eyebox, the eyebox corresponding to a region in space that is occupied by an eye of a user of the system; and
   a scanning assembly configured to continuously shift a direction of the optically corrected light in accordance with instructions such that multifocal content is presented to the eye box, multifocal content describing content presented at one or more image planes,
   wherein the instructions modify an amplitude and a frequency of shifts in the direction of the optically corrected light and the electronic display is configured to emit light in accordance with a curved display pattern, and the first position and the second position describe different positions of the electronic display along the curved display pattern.

18. The system of claim 17, wherein the system further comprises:
   an eye tracking system configured to determine eye tracking information and provide the determined eye tracking information to a controller, the controller further configured to:
   estimate a location of an accommodation plane of the user based in part on the determined eye tracking information,
   determine a position of the scanning assembly that corresponds to the estimated accommodation plane, and
   wherein the instructions are generated based in part on the determined position of the scanning assembly.

19. The system of claim 17, wherein the first portion of the electronic display is an oscillating electronic display and includes a sub-pixel that emits light at the first position and emits light at a third position of the oscillating electronic display, and the sub-pixel appears to be radially displaced in the third position relative to the first position, and the amount of radial displacement is at most a diameter of an emission area of the sub-pixel.

20. A system, comprising:
   an oscillating electronic display, in accordance with instructions, configured to continuously oscillate along an optical axis through a range of positions and comprising sub-pixels arranged radially, wherein a first portion of the oscillating electronic display includes a sub-pixel that emits first image light at a first position of the range of positions and emits second image light at a second position of the range of positions, the sub-pixel appearing to be radially displaced in the second position relative to the first position;
   an optics block configured to adjust the first image light and the second image light to form optically corrected light, and direct the optically corrected light to an eyebox, the eyebox corresponding to a region in space that is occupied by an eye of a user of the system; and
   a controller configured to provide the instructions to the electronic display.

21. The system of claim 20, wherein the amount of radial displacement is at most a diameter of an emission area of the sub-pixel.

* * * * *